Nov. 21, 1933.　　　C. P. WILSON, JR　　　1,935,967
TREATING HYDROCARBON OILS
Filed Aug. 7, 1925
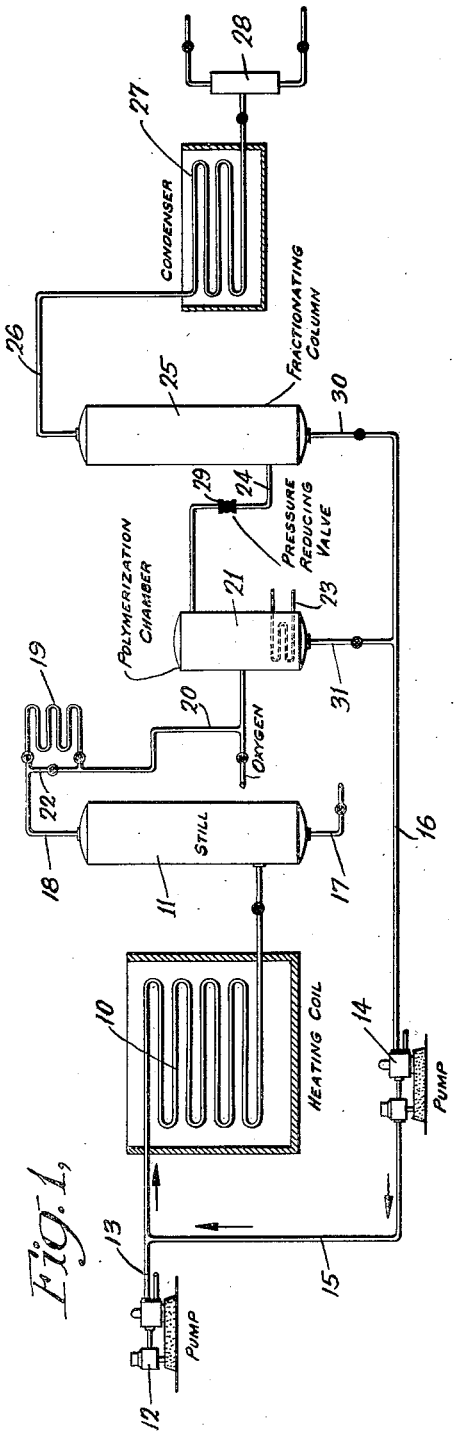
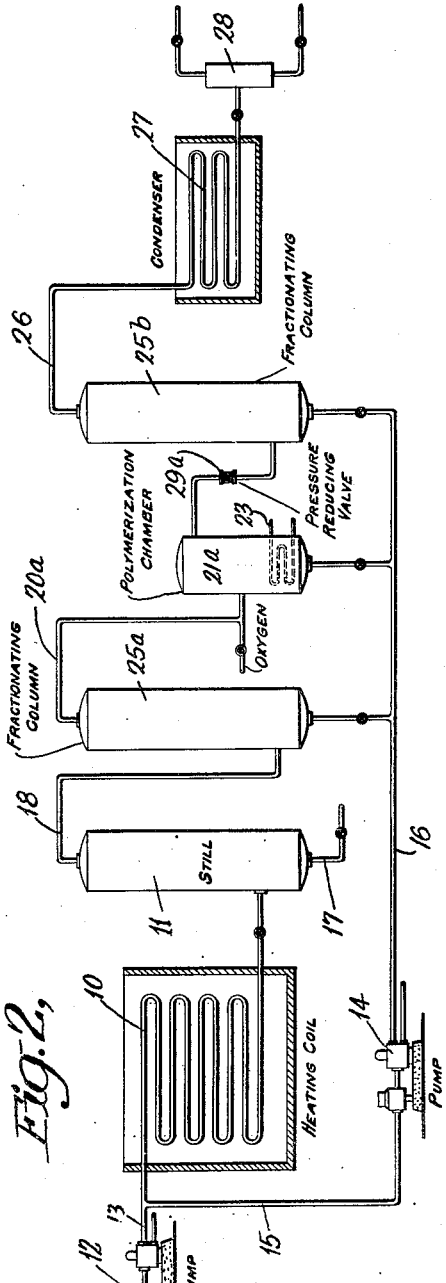
Inventor
Charles P. Wilson
By his Attorney
R. J. Dearborn Patented Nov. 21, 1933

1,935,967

UNITED STATES PATENT OFFICE 1,935,967

TREATING HYDROCARBON OILS

Charles P. Wilson, Jr., Port Arthur, Tex., assignor, by mesne assignments, to The Texas Company, New York, N. Y., a corporation of Delaware Application August 7, 1925. Serial No. 48,709

18 Claims. (Cl. 196—42)

This invention relates to the manufacture of gasoline, naphtha, and the like of highly stable character.

In present methods of manufacturing cracked gasoline by the pyrogenic decomposition of hydrocarbon oils the gasoline produced is ordinarily of highly unstable character and during storage certain reactions of these unstable compounds take place which either cause the oil to become discolored or result in the formation of gummy or resinous bodies and frequently produce both discoloring and formation of gummy constituents. It is my present opinion that these reactions are the result of polymerization of certain highly unstable compounds that are formed in the cracking reaction. Thus it is known that the diolefins may be readily polymerized to form gummy or resinous bodies and I believe that it is compounds of this nature, produced in the cracking reaction and which remain in the final gasoline as it is marketed, that constitute potential gum- or resin-forming constituents. I have found that these unstable bodies may by proper treatment be removed from the oil so as to produce a stable product.

Broadly and generally my invention contemplates subjecting a higher boiling hydrocarbon oil to a cracking temperature to effect conversion of higher boiling hydrocarbons into lower boiling ones and then treating the evolved products to remove the highly unstable products, such as the diolefins, so as to obtain cracked products of stable character. The products of the cracking reaction are subjected to conditions under which the diolefins and similar unstable compounds react to form other products which may readily be separated from the rest of the oil by distillation or fractionation. Thus by subjecting the cracked products to treatment so as to effect polymerization of the highly unstable bodies polymer compounds are formed which are of higher boiling point than the original cracked constituents from which they are formed, which higher boiling products may readily be separated from the rest of the oil by rectification.

I have found that heat greatly accelerates the polymerization of the diolefins and similar compounds and that by digesting or maintaining the cracked products at a sufficient temperature the unstable bodies are polymerized and may thus be removed from the oil so as to obtain thereby a stable product.

One method of effecting the removal of the unstable gum-forming bodies is to contact the cracked products with air or other oxidizing fluid to thereby accelerate chemical reaction of these unstable bodies and thus make possible their removal.

In practicing the invention the hydrocarbon oil vapors or other products of the cracking reaction are reduced in temperature so as to prevent any further cracking, at least to any material extent, and the cracked products are held at a temperature such that relatively rapid polymerization of the unstable bodies occurs, or the cracked products are contacted with air or other oxidizing fluid, and the resultant products obtained from the polymerization or treatment of the unstable bodies are removed from the rest of the oil by suitable distilling or fractionating means.

In the preferred method of carrying on the invention the oil being converted is subjected to distillation under superatmospheric pressure and the evolved vapors while still under a material superatmospheric pressure are digested or maintained at a temperature at which rapid polymerization of the unstable bodies takes place. The vapors are removed from the still and are then maintained at an elevated temperature below still temperature to produce polymerization of the undesirable constituents. The higher boiling products thus formed are removed from the rest of the oil by fractionation. The polymerization treatment is preferably carried on under a material pressure and the pressure is reduced to facilitate distillation so as to separate out as a residue or bottoms the higher boiling products formed in the polymerization treatment.

The invention will now be described in detail with reference to certain novel apparatus illustrated in the accompanying drawing wherein:

Figure 1 is a diagrammatic sectional elevation of a cracking and treating unit constructed in accordance with the invention and constituting an embodiment thereof.

Figure 2 is a diagrammatic sectional elevation of a modified form of the invention.

The apparatus thus illustrated represents a tube and tank, or coil and drum, cracking system wherein 10 is a heating coil adapted to heat the oil to a cracking temperature and 11 is a still where distillation or vaporization takes place. The oil to be treated is drawn from a suitable source by a pump 12 and forced through the charging line 13 to the heating coil 10, it being of course understood that if desired the oil may, before its introduction to the heating coil 10, be preheated by waste heat from the furnace employed in heating the coil 10, or by waste heat from a furnace used in heating the still 11, or by heat exchange with the vapors or tar formed in the process or by other suitable means. The still 11 is insulated to retard loss of heat or is installed in a suitable heating chamber. If desired, a battery of stills may be employed in lieu of the single still shown in the drawing. A pump 14, which is preferably a hot oil pump, is provided with a discharge line 15 which communicates with the charging line 13 or inlet of the heating coil 10 and with an inlet line 16 supplied with liquid from a source that is hereinafter more fully explained. The still 11 may be provided with a residue or tar line 17 and with a vapor line 18.

In the type of apparatus shown in Figure 1 the vapor line 18 communicates with a cooling coil 19 from which a line 20 extends to a polymerization or treating chamber 21. A by-pass line 22 is provided so that by proper manipulation of the valves shown the vapors from the still may be passed to the treating chamber 21 through the cooling coil 19 or by-passed around the coil directly to the treating chamber. The coil 19 may be air cooled or it may be immersed in a suitable cooling fluid.

The polymerization chamber 21 is shown as supplied with heating means in the form of a steam coil 23 which is sometimes necessary to maintain the desired temperature for treatment in the chamber 21. A pipe 24 is provided to conduct products from the polymerizing chamber to a column still or rectifying tower 25. The fractionating column may be in the form of a packed tower or bubble tower or other suitable fractionating or rectifying means and may be equipped with a cooling coil or with a reflux condenser for the purpose of furnishing a cooling or reflux liquid. A vapor line 26 extends from the fractionating apparatus 25 to a condenser coil 27 and a receiving drum 28 is provided for collecting the final condensate or distillate.

The line 24 is equipped with a pressure reducing valve 29 so that the pressure obtaining in the still 11 and polymerizing chamber 21 may be materially dropped or reduced so that the fractionation may be carried on at atmospheric pressure or at a pressure approaching atmospheric. It is desirable to have a large drop in pressure between the polymerizing chamber and the fractionating still or column so that the expansion due to the drop in pressure may be utilized in effecting the distillation of the treated products. Thus with pressures in the still 11 and polymerizing chamber 21 of, for example around 100 to 400 pounds, the fractionating column 25 may be held at around 10 and 15 pounds pressure, that is, just sufficient to insure a good flow of distillate into the receiving drum 28. While it is preferable to rely largely on the reduction in pressure to secure the desired vaporization in the fractionating column 25, heating means, such as a steam coil in the bottom of the column, may be provided to aid in the distillation.

The fractionating column 25 is provided with an outlet line 30 for removing the higher boiling polymer products and also other hydrocarbons of higher boiling point than that desired for the final distillate. The line 30 preferably communicates with the pump inlet line 16 so that these products may be cycled back to the heating coil 10. The treating chamber 21 may likewise be equipped with a line 31 which communicates with the line 16.

In practicing the invention with the apparatus shown in Figure 1 the oil to be treated, which may for example be a petroleum distillate or residuum such as gas oil, after such preheating as may be desired, is introduced to the heating coil 10 wherein it is raised to a cracking temperature. The oil then passes into the still 11 wherein cracking or decomposition of higher boiling into lower boiling hydrocarbons takes place. The temperatures and pressures suitable for cracking hydrocarbon oils are well known and need not be restated here. The evolved vapors are conducted by the vapor line 18 to the polymerization chamber 21, being passed by way of the cooling coil 19, if necessary. The temperature maintained in the chamber 21 is lower than that of the still 11 and should be low enough to insure that no further cracking or decomposition takes place. The digestion in the polymerizing chamber permits the undesirable potential gum-forming constituents to be polymerized or converted into products of higher boiling point. Some of these constituents together with other liquid products collected in the polymerizing chamber may be removed by the pipe 31 while the rest of the products, which may be in vapor form, may be passed to the rectifying or fractionating apparatus 25, or if desired the entire product of the polymerizing chamber including both liquid and vapors may be passed to the rectifying apparatus. The conditions are maintained in the fractioning apparatus 25 so as to take off an overhead distillate through the vapor line 26 of desired boiling point while the higher boiling constituents including polymer products formed in the polymerizing reaction are removed by the pipe 30 and may be returned to the cracking zone by means of the pump 14. The gasoline vapors are cooled in the coil 27 and collected as a condensate in the receiver 28.

In employing the apparatus shown in Figure 2 a preliminary fractionation of the evolved vapors from the cracking unit is obtained before the polymerizing operation is carried on. Thus the vapors from the still are conducted by the pipe 18 to a fractionating or rectifying column 25a wherein such fractionation is carried on so as to take off an overhead distillate through the line 20a that may be of approximately the boiling point desired for the final product. The cooling necessary to secure this desired fractionation reduces the temperature of the overhead distillate so that it is ordinarily unnecessary to employ any additional cooling means. This distillate is then admitted to the polymerizing chamber 21a wherein it is maintained under the influence of heat for a time so as to effect polymerization of the unstable gum-forming compounds. The products are then passed into another column 25b wherein a further fractionating or rectifying operation is carried on so that the polymer products may be removed as a condensate from the tower while the desired gasoline distillate is carried off as a vapor through the line 26, condensed in the cooling coil 27 and collected in the receiving drum 28.

It is preferable to carry on the polymerizing operation while the products undergoing treatment are under more or less pressure, for example under a pressure approximately the same as that in which the cracking or distillation under pressure takes place. The subsequent fractionating or rectifying operation for the removal from the gasoline of the polymer products formed, or other constituents of higher boiling point than that desired for the gasoline or final distillate, is preferably carried on at a pressure materially lower than that at which the polymerization takes place.

When it is desired to introduce air or oxygen or other oxygen-containing gas for the purpose of aiding or accelerating the polymerizing action this gas may be introduced into the line 20 or 20a and the mixed oxygen and hydrocarbons thus passed into the polymerizing chamber.

It is to be understood that it is not desired in the practice of the invention to carry on a polymerizing action of such extent as to destroy the bulk of the unsaturated constituents formed in the cracking reaction since most of these compounds are useful in motor fuel. It is only desired to polymerize and effect the removal of certain undesirable constituents such as the diolefins which are highly reactive and which constitute potential gum-forming bodies.

The practice of my invention makes it possible to take off continuously a distillate of desired gravity or boiling point that is highly purified and stable in character and which ordinarily requires no further treatment to render it marketable.

Obviously many modifications and variations of the invention, as hereinbefore set forth, may be made without departing from the spirit and scope thereof, and therefore, only such limitations should be imposed as are indicated in the appended claims.

What I claim is:

1. In the manufacture of cracked gasoline of superior stability, the process that comprises subjecting higher boiling hydrocarbon oil to conditions of pyrolytic cracking to effect conversion into lower boiling products including gasoline constituents and effecting a separation of the products of cracking into liquid and vapor constituents, directing the separated vapors into an enlarged free and unobstructed polymerizing zone, introducing an oxidizing gas into said polymerization zone to effect reaction with potentially unstable or gum-forming constituents of the vapors, effecting a separation between resultant liquid products and vapors in the polymerization chamber, removing the separated vapors from the polymerization chamber and recovering therefrom a gasoline distillate of desired boiling point and stability.

2. In the manufacture of cracked gasoline of superior stability, the process that comprises subjecting higher boiling hydrocarbon oil to conditions of pyrolitic cracking under superatmospheric pressure to effect conversion into lower boiling products including gasoline constituents and effecting a separation of the products of cracking into liquid and vapor constituents, passing the vapors to a fractionating zone and subjecting them to fractionation therein to separate out higher boiling constituents thereof and to obtain a vapor fraction having a boiling range approximately the same as that of the desired gasoline distillate, introducing an oxidizing gas into contact with said gasoline vapor fraction while under a superatmospheric pressure to effect polymerization of potentially unstable or gum forming constituents and subjecting the gasoline vapor fraction thus treated to fractionation in another fractionating zone to separate out higher boiling undesired constituents therefrom and to recover a gasoline distillate of desired boiling point and stability.

3. In the manufacture of cracked gasoline of superior stability, the process that comprises subjecting higher boiling hydrocarbon oil to conditions of pyrolitic cracking to effect conversion into lower boiling products including gasoline constituents and separating the products of cracking into vapors and liquid constituents subjecting the vapors to fractionation to separate out the gasoline fraction, directing said gasoline fraction into an enlarged polymerization zone wherein a body of said gasoline fraction is maintained, introducing an oxidizing gas into contact with the said gasoline fraction in said polymerization zone to effect reaction with only potentially unstable or gum forming constituents and recovering from the products of said reaction a gasoline of stable character free from said potentially unstable constituents.

4. In the manufacture of cracked gasoline of superior stability, the process that comprises subjecting hydrocarbon oil to cracking conditions of temperature and pressure to effect substantial conversion thereof, separately withdrawing cracked vaporous products from said cracking operation and subjecting them to fractionation to separate undesired constituents thereof and obtain a fraction having a boiling range approximately the same as the desired gasoline, passing said fraction to a polymerization zone, introducing an oxidizing gas into said polymerization zone to effect reaction with potentially unstable or gum forming constituents of the said fraction to form polymers, separately withdrawing from said polymerization operation polymers formed therein, returning polymers to said cracking operation, separately withdrawing the treated fraction from said polymerization operation and passing said treated fraction to a zone wherein vapors thereof are fractionated to condense undesired constituents therefrom and condensing the remaining vapors to form the gasoline of desired boiling point and stability.

5. The method of producing a relatively stable low boiling hydrocarbon distillate product which comprises subjecting a higher boiling hydrocarbon oil to cracking conditions of temperature and pressure, withdrawing cracked vaporous products, cooling said vaporous products to a polymerizing and stabilizing temperature below the cracking temperature, thereafter maintaining said cracked products in an enlarged polymerization zone wherein a body of said cracked products is maintained for an extended period of time at said temperature and under a pressure of several hundred pounds while avoiding any substantial cooling of the products, introducing an oxidizing gas into said enlarged polymerization zone to effect reaction with potentially unstable or gum-forming constituents thereof, thereafter discharging substantially all of the products from said enlarged zone into a fractionating zone, fractionating them in said zone, withdrawing the fractionated vapors from said fractionating zone and condensing them to form the desired stable low boiling distillate product.

6. In the manufacture of cracked gasoline of superior stability, the process that comprises subjecting hydrocarbon oil to cracking conditions of temperature and pressure to effect substantial conversion thereof, separately withdrawing cracked vaporous products from said cracking operation and subjecting them to fractionation to separate undesired constituents thereof and obtain a fraction having a boiling range approximately the same as the desired gasoline, passing said fraction to a polymerization operation wherein unstable gum-forming constituents thereof are polymerized in the absence of solid adsorptive contact material while being maintained under superatmospheric pressure, separately withdrawing from said polymerization operation polymers formed therein, returning polymers to said cracking operation, separately withdrawing the treated fraction from said polymerization operation and passing said treated fraction to a zone wherein vapors thereof are fractionated to condense undesired constituents therefrom and condensing the remaining vapors to form the gasoline of desired boiling point and stability.

7. In the manufacture of cracked gasoline of superior stability, the process that comprises subjecting hydrocarbon oil to cracking conditions of temperature and pressure to effect substantial conversion thereof, separately withdrawing cracked vaporous products from said cracking operation and subjecting them to fractionation to separate undesired constituents thereof and obtain a fraction having a boiling range approximately the same as the desired gasoline, passing said fraction to a polymerization operation wherein unstable gum-forming constituents thereof are polymerized in the absence of solid adsorptive contact material while being maintained under superatmospheric pressure, separately withdrawing from said polymerization operation polymers formed therein, returning polymers to said cracking operation, separately withdrawing the treated fraction from said polymerization operation and passing said treated fraction to a zone of reduced pressure wherein vapors thereof are fractionated to condense undesired constituents therefrom and condensing the remaining vapors to form the gasoline of desired boiling point and stability.

8. In the manufacture of cracked gasoline of superior stability, the process that comprises subjecting hydrocarbon oil to cracking temperature in a cracking zone wherein separation of vapors from liquid takes place, maintaining a high superatmospheric pressure on the vapors undergoing said separation, cooling the separated vapors to a temperature below an active cracking temperature and digesting the vapors in a polymerizing chamber in the absence of solid adsorptive contact material, maintaining the products in the polymerizing chamber at an elevated temperature below a cracking temperature and at a superatmospheric pressure to effect polymerization of unstable bodies having potential gum-forming character and separating out from the products of the polymerization a gasoline distillate of desired boiling point and stability.

9. In the manufacture of cracked gasoline of superior stability, the process that comprises subjecting higher boiling hydrocarbon oil to conditions of pyrolytic cracking under superatmospheric pressure to effect conversion into lower boiling products including gasoline constituents and effecting a separation of the products of cracking into liquid and vapor constituents, passing the vapors to a fractionating zone and subjecting them to fractionation therein to separate out higher boiling constituents thereof and to obtain a vapor fraction having a boiling range approximately the same as that of the desired gasoline distillate, subjecting said gasoline vapor fraction to heating under high superatmospheric pressure and at a temperature below cracking temperature to effect polymerization of unstable bodies having potential gum-forming character, and subjecting the gasoline vapor fraction thus treated to fractionation to separate out higher boiling undesired constituents therefrom and to recover a stable gasoline distillate of desired boiling point and stability.

10. In the manufacture of cracked gasoline of superior stability the process that comprises subjecting higher boiling hydrocarbon oil to conditions of pyrolytic cracking to effect conversion into lower boiling products including gasoline constituents and separating the products of cracking into vapors and liquid constituents, subjecting the vapors to fractionation to separate out a gasoline fraction, subjecting said gasoline fraction to heating under high superatmospheric pressure and at a temperature below a cracking temperature to effect polymerization of unstable bodies having potential gum-forming character and recovering from the products of said reaction a gasoline of stable character free from said potentially unstable constituents.

11. In the conversion of higher boiling hydrocarbon oils into lower boiling ones, the process that comprises subjecting the oil to cracking and vaporization by the application of heat under superatmospheric pressure, subjecting evolved vapors to cooling below a cracking temperature to effect partial condensation, passing the resultant cooled fluids while still at an elevated temperature to a separate polymerizing chamber and subjecting them to digestion therein under superatmospheric pressure and at an elevated temperature to thereby effect polymerization and stabilization of hydrocarbon constituents, expanding the resultant products including polymerized liquids into a fractionating tower and subjecting them to fractionation therein under reduced pressure to form a vapor fraction and a reflux condensate and condensing the vapor fraction to form a final stabilized distillate.

12. The method of producing a relatively stable low boiling hydrocarbon distillate product which comprises subjecting a higher boiling hydrocarbon oil to cracking conditions of temperature and pressure, withdrawing cracked vaporous products, cooling said vaporous products to a polymerizing and stabilizing temperature below the cracking temperature, thereafter maintaining said cracked products in an enlarged zone for an extended period of time at said temperature and under a pressure of several hundred pounds while avoiding any substantial cooling of the products, thereby polymerizing and stabilizing hydrocarbon constituents thereof, thereafter discharging substantially all of the products from said enlarged zone into a fractionating zone, fractionating them in said zone, withdrawing the fractionated vapors from said fractionating zone and condensing them to form the desired stable low boiling distillate product.

13. The method of producing a relatively stable low boiling hydrocarbon distillate product which comprises subjecting a higher boiling hydrocarbon oil to cracking conditions of temperature and pressure, withdrawing cracked vaporous products, cooling said vaporous products to a temperature below a cracking temperature, thereafter passing at least a portion of the cooled cracked products into an enlarged zone wherein they are maintained at a polymerizing and stabilizing temperature below cracking temperature and under a pressure of several hundred pounds for an extended period of time while avoiding any substantial cooling, thereby polymerizing and stabilizing hydrocarbon constituents thereof, thereafter discharging substantially all of the products from said enlarged zone into a fractionating zone, fractionating them in said zone, withdrawing the fractionated vapors from said fractionating zone and condensing them to form the desired stable low boiling distillate product.

14. The method of producing a relatively stable low boiling hydrocarbon distillate product which comprises subjecting a higher boiling hydrocarbon oil to cracking conditions of temperature and pressure, withdrawing cracked vaporous products, cooling said vaporous products to a polymerizing and stabilizing temperature below the cracking temperature, thereafter maintaining said cracked products in an enlarged zone for an extended period of time at said temperature and under a pressure of several hundred pounds while avoiding any substantial cooling of the products, thereby polymerizing and stabilizing hydrocarbon constituents thereof, thereafter discharging substantially all of the products from said enlarged zone into a fractionating zone, fractionating them in said zone to form a vapor fraction and a condensate, withdrawing the vapor fraction from said fractionating zone and condensing it to form the desired stable low boiling distillate product and returning the condensate from said fractionating zone to the oil being subjected to cracking conditions of temperature and pressure.

15. The method of producing a relatively stable low boiling hydrocarbon distillate product which comprises subjecting a higher boiling hydrocarbon oil to cracking conditions of temperature and pressure, withdrawing cracked vaporous products, cooling said vaporous products to a temperature below a cracking temperature, thereafter passing at least a portion of the cooled cracked products into an enlarged polymerization zone wherein a body of said cracked products is maintained for an extended period of time below cracking temperature and under a pressure of several hundred pounds while avoiding any substantial cooling of the products, introducing an oxidizing gas into said enlarged polymerization zone to effect reaction with potentially unstable or gum forming constituents thereof, thereafter discharging substantially all of the products from said enlarged zone into a fractionating zone, fractionating them in said zone, withdrawing the fractionated vapors from said fractionating zone and condensing them to form the desired stable low boiling distillate product.

16. In the manufacture of cracked gasoline of superior stability the process that comprises subjecting higher boiling hydrocarbon oil to conditions of pyrolytic cracking to effect conversion into lower boiling products including gasoline constituents and separating the products of cracking into vaporous and liquid constituents, subjecting the vapors to fractionation to separate out a fraction containing gasoline constituents, subjecting said gasoline fraction to heating under high superatmospheric pressure at a temperature below a cracking temperature to effect polymerization of unstable bodies having potential gum forming character, separately withdrawing polymers formed in said polymerization operation, separately withdrawing the treated gasoline fraction from the polymerization operation and recovering therefrom said gasoline fraction substantially free from said unstable constituents.

17. In the manufacture of cracked gasoline of superior stability the process that comprises subjecting higher boiling hydrocarbon oil to conditions of pyrolytic cracking to effect conversion into lower boiling products including gasoline constituents and separating the products of cracking into vaporous and liquid constituents, subjecting the vapors to fractionation to separate out a fraction containing gasoline constituents, subjecting said gasoline fraction to heating under high superatmospheric pressure at a temperature below a cracking temperature to effect polymerization of unstable bodies having potential gum forming character, thereafter discharging substantially all of the products from the polymerization operation into a fractionating zone and recovering therefrom a gasoline fraction substantially free from said unstable constituents.

18. In the manufacture of cracked gasoline of superior stability the process that comprises subjecting higher boiling hydrocarbon oil to conditions of pyrolytic cracking to effect conversion into lower boiling products including gasoline constituents and separating the products of cracking into vaporous and liquid constituents, subjecting the vapors to fractionation to separate out a fraction containing gasoline constituents, subjecting said gasoline fraction to heating under high superatmospheric pressure at a temperature below a cracking temperature to effect polymerization of unstable bodies having potential gum forming character, thereafter discharging substantially all of the products from the polymerization operation into a fractionating zone wherein polymers formed in said polymerization treatment are separated and collected in liquid form, separately withdrawing said polymers from the latter fractionating zone and returning them to the aforesaid cracking operation, and separately withdrawing from the said latter fractionating zone a gasoline fraction substantially free from said unstable constituents.

CHARLES P. WILSON, Jr.